United States Patent
Unnikrishnan et al.

(10) Patent No.: US 9,122,481 B2
(45) Date of Patent: Sep. 1, 2015

(54) SYSTEM AND METHOD FOR STANDBY POWER REDUCTION IN A SERIAL COMMUNICATION SYSTEM

(75) Inventors: Manoj Unnikrishnan, Santa Clara, CA (US); Sarvesh Shrivastava, Sunnyvale, CA (US); Lalitkumar Nathawad, Fremont, CA (US)

(73) Assignee: Qualcomm Incorporated, San Diego, CA (US)

( * ) Notice: Subject to any disclaimer, the term of this patent is extended or adjusted under 35 U.S.C. 154(b) by 295 days.

(21) Appl. No.: 13/540,488

(22) Filed: Jul. 2, 2012

(65) Prior Publication Data

US 2013/0007489 A1 Jan. 3, 2013

Related U.S. Application Data

(60) Provisional application No. 61/504,058, filed on Jul. 1, 2011.

(51) Int. Cl.
*G06F 1/26* (2006.01)
*G06F 1/32* (2006.01)

(52) U.S. Cl.
CPC ............ *G06F 1/3278* (2013.01); *G06F 1/3209* (2013.01); *G06F 1/26* (2013.01); *Y02B 60/126* (2013.01); *Y02B 60/32* (2013.01)

(58) Field of Classification Search
USPC .................................................. 713/320, 340
See application file for complete search history.

(56) References Cited

U.S. PATENT DOCUMENTS

| | | | |
|---|---|---|---|
| 6,055,641 A | 4/2000 | Konaka et al. | |
| 6,215,764 B1* | 4/2001 | Wey et al. | 370/216 |
| 7,036,031 B2 | 4/2006 | Takeuchi | |
| 7,188,263 B1 | 3/2007 | Rubinstein et al. | |
| 7,647,515 B2 | 1/2010 | Verdun | |
| 8,208,486 B2 | 6/2012 | Park et al. | |
| 8,352,764 B2* | 1/2013 | Tan et al. | 713/320 |
| 2003/0185308 A1* | 10/2003 | Schoenborn | 375/257 |
| 2005/0144488 A1 | 6/2005 | Lee et al. | |
| 2006/0023633 A1* | 2/2006 | Caruk et al. | 370/252 |

(Continued)

FOREIGN PATENT DOCUMENTS

| | | |
|---|---|---|
| EP | 1168717 A2 | 1/2002 |
| JP | H10136049 A | 5/1998 |

(Continued)

OTHER PUBLICATIONS

International Search Report and Written Opinion—PCT/US2012/045320—ISA/EPO—Oct. 25, 2012.

(Continued)

*Primary Examiner* — Jaweed A Abbaszadeh
*Assistant Examiner* — Phil Nguyen
(74) *Attorney, Agent, or Firm* — Bay Area Technology Law Group PC (57) ABSTRACT

In a serial communication system having a device including a receiver detection module, this specification is directed to systems and methods for selectively reducing the power consumed by the receiver detection module, preferably when the device is operating in a low power mode. In some embodiments, a signal detection module is configured to receive a control signal from the transmitter of a device at the other end of the communications link to control the operation of the receiver detection module. The control signal may be in-band or may be transmitted on a sideband of the serial link.

9 Claims, 8 Drawing Sheets

(56) References Cited

U.S. PATENT DOCUMENTS

| | | | |
|---|---|---|---|
| 2006/0184809 A1* | 8/2006 | Kojou et al. | 713/300 |
| 2007/0076747 A1* | 4/2007 | Zinaty | 370/463 |
| 2007/0173216 A1* | 7/2007 | Blum | 455/212 |
| 2008/0233912 A1* | 9/2008 | Hunsaker et al. | 455/219 |
| 2008/0244287 A1 | 10/2008 | Kwa et al. | |
| 2009/0083587 A1* | 3/2009 | Ng et al. | 714/47 |
| 2010/0262851 A1* | 10/2010 | Chien | 713/320 |
| 2012/0082463 A1 | 4/2012 | Kasprzyk | |
| 2012/0191996 A1* | 7/2012 | Cheong | 713/320 |

FOREIGN PATENT DOCUMENTS

| | | | |
|---|---|---|---|
| JP | 2000115222 A | 4/2000 | |
| JP | 2005080105 A | 3/2005 | |
| JP | 3763903 B2 | 4/2006 | |
| JP | 2007259339 A | 10/2007 | |
| JP | 2009176294 A | 8/2009 | |
| JP | 2010122858 A | 6/2010 | |
| KR | 20090060700 A | 6/2009 | |

OTHER PUBLICATIONS

Ravi B et al., "Passage—PCI Express System Architecture", PCI Express System Architecture, Sep. 4, 2003, p. 48pages, , Addison-Wesley, US, XP007901254.

* cited by examiner

SYSTEM AND METHOD FOR STANDBY POWER REDUCTION IN A SERIAL COMMUNICATION SYSTEM

RELATED APPLICATIONS

The present application claims priority of provisional patent application Ser. No. 61/504,058 entitled SYSTEM AND METHOD FOR PCI EXPRESS STANDBY POWER REDUCTION, filed Jul. 1, 2011.

FIELD OF THE PRESENT INVENTION

The present application relates to PCI Express and other serial communication protocols and more particularly to a system and method to reduce the power consumed by a system operating under a serial communication protocol architecture.

BACKGROUND OF THE INVENTION

Serial communication systems are widely used for the transfer of information between devices. Typically, serial communications involve the use of a serializer block to convert a parallel data source into a serial stream and the associated use of a deserializer block to return the stream to its original state. Generically, such communication systems are known as "SerDes" interfaces. PCI Express (PCIe) is one example of such a serial interconnect technology, promoted by the PCI-SIG (Special Interest Group). PCI Express technology is a low cost, highly scalable, switched, point-to-point, serial I/O interconnect. PCI Express is a layered architecture including at least a transaction layer, a data link layer and a physical layer. The transaction layer is responsible for transporting read/write requests from software to the I/O devices. The data link layer is primarily responsible for ensuring reliable delivery of packets across the PCI Express link. The physical layer (PHY) handles the low level PCI Express protocol and signaling. The PHY layer consists of a dual simplex channel implemented as a transmit and a receive pair. The combination of a transmit and receive pair are commonly referred to as a lane. The current standard, PCI Express 3.0, uses a 128b/130b encoding scheme and an 8 GT/s bit rate to provide a bandwidth capacity of 1 GB/s per lane.

An ongoing trend in the design of modern communications equipment is the drive to increase the power efficiency of the devices. Particularly with mobile devices or other battery-powered devices, greater power efficiency is almost a universally desirable attribute. To that end, various types of power saving mechanisms are often employed.

At a fundamental level, any communications system may be viewed as including a receiver portion and a transmitter portion. With regard to the receiver portion, one power savings strategy is to operate the receiver in one or more low power modes, or power save states, as frequently as practical and for periods of time as long as practical, as opposed to the full power, active state. Although some degradation in overall throughput or latency may occur, this often may be balanced against the power efficiency gained.

In further regard to a communications system embodied as a serial link between a receiver portion and a transmitter portion, these power savings techniques may include the use of a receiver detection module, such as one implementing electrical idle detection logic, configured to receive an appropriate idle signal from the transmitter portion for coordinating a power save state for the serial link. The receiver detection module typically places the receiver in active state on the basis of a first state of the idle signal and places the receiver in power save state on the basis of a second state of the idle signal.

For mobile high-speed data communications, it is desirable to have a high-speed, low-power interface. While PCI Express is recognized as a preferred high-speed interface, PCI Express is not recognized as a low power solution for mobile devices where battery life is critical. Accordingly, there is a need in the art for a method and apparatus that significantly reduces the power consumption of PCI Express interfaces and other serial communication systems.

SUMMARY OF THE INVENTION

In accordance with the above needs and those that will be mentioned and will become apparent below, this disclosure is directed to the realization of additional gains in power efficiency that may be achieved by placing the receiver detection module in a power save state when the receiver portion is in low power mode. Preferably, this may be implemented without adding unacceptable amounts of latency to the transition of the receiver portion from low power mode to active operation.

As such, this specification discloses a communication system including a transmitter, a receiver with a receiver detection module and a power module, and a serial link between the transmitter and the receiver, wherein the receiver detection module is configured to be operable during a power save state of the serial link to determine an operational condition of the serial link and wherein the power module is configured to selectively operate the receiver detection module in a low power mode during the power save state of the serial link. In one embodiment, the low power mode of the receiver detection module is a duty cycle mode.

One aspect of the disclosure is directed to a system having a sideband link between the transmitter and the receiver, wherein the power module is configured to selectively operate the receiver detection module in the low power mode on the basis of a control signal carried by the sideband link.

In another aspect, the communication systems has a signal detection module configured to sense a control signal carried on the serial link and operatively coupled to the power module, wherein the power module is configured to selectively operate the receiver detection module in the low power mode on the basis of the control signal. Preferably, the signal detection module may be configured to detect a common mode signal or a differential mode signal carried on the serial link.

Further, the serial link may be a PCIe link. In such embodiments, the receiver detection module may include electric idle detection logic. Preferably, the power module may be configured to disable the electric idle detection logic to selectively operate the receiver detection module in the low power mode.

This disclosure is also directed to a serial communication system including a host having a transmitter and a client having a receiver, wherein the transmitter and the receiver are configured to communicate through transfer of differential data signals using a protocol that specifies at least one active state and at least one power save state, a receiver detection module in the client configured be operable during the power save state, and a power module in the client configured to selectively operate the receiver detection module in low power mode on the basis of a control signal from the host.

In one aspect, the receiver detection module may be electric idle detection logic and the low power mode of the receiver detection module may disable the electric idle detection logic. In such embodiments, the serial communication system may be a PCIe system and the active state of the serial communication system may be a L0 link state and the power save state of the serial communication system may be a L1 link state.

In another aspect, the system may include a sideband and the power detection module may receive the control signal on the sideband.

Alternatively, the host may be configured to transmit the control signal in-band and the client may include a signal detection module configured to sense the control signal. Preferably, the signal detection module may be configured to sense an in-band common mode signal or an in-band differential mode signal.

In another aspect, the power module selectively operates the receiver detection module in low power mode by operating the receiver detection module in a duty cycle mode.

This disclosure is also directed to a method for standby power reduction in a serial communication system having a transmitter and receiver, communicating over a serial data link, including the steps of operating the serial data link in a power save state and selectively operating a receiver detection module of the receiver in a low power mode while the serial data link is in the power save state.

In one aspect, the serial data link may be a PCIe link, wherein the power save state of the serial data link is an L1 state, and wherein the low power mode comprises disabling electrical idle detection logic in the receiver detection module.

The method may also include selectively operating the receiver detection module on the basis of a control signal sent by the transmitter. The transmitter and receiver may be coupled by a sideband link and the control signal may be a transition in a sideband signal. Alternatively, the method may include sending the control signal in-band with the transmitter and detecting the control signal with the receiver. In such embodiments, the control signal may be a common mode signal or may be a differential mode signal.

While many aspects of the invention are described for in the context of a PCI Express protocol, the invention may be applied to any serial communication system as desired.

BRIEF DESCRIPTION OF THE DRAWINGS

Further features and advantages will become apparent from the following and more particular description of the preferred embodiments of the invention, as illustrated in the accompanying drawing.

DETAILED DESCRIPTION OF THE INVENTION

At the outset, it is to be understood that this disclosure is not limited to particularly exemplified materials, architectures, routines, methods or structures as such may, of course, vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

Some portions of the descriptions which follow are presented in terms of procedures, logic blocks, processing and other symbolic representations of operations on and transfers of data bits within a serial communication network. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining,", "availability requests", and "network status", or the like, refer to the actions and processes of a serial communications network.

In the figures, a single block may be described as performing a function or functions; however, in actual practice, the function or functions performed by that block may be performed in a single component or across multiple components, and/or may be performed using hardware, using software, or using a combination of hardware and software. Also, the exemplary wireless network devices may include components other than those shown, including well-known components such as a processor, memory and the like.

Unless defined otherwise, all technical and scientific terms used herein have the same meaning as commonly understood by one having ordinary skill in the art to which the disclosure pertains.

Further, all standards cited herein, whether supra or infra, are hereby incorporated by reference in their entirety.

Finally, as used in this specification and the appended claims, the singular forms "a," "an" and "the" include plural referents unless the content clearly dictates otherwise.

During operation, many implementations of serial communication systems may involve the use of a transmitter or receiver device configured to enter various power saving states. For example, such a device may be configured to feature an active state during which normal operation occurs and at least one power save state during which some functionality is compromised in exchange for a reduced consumption of power. In one aspect, the receiver of a device may be configured to enter the power save state upon a condition of the communications link, such as the receipt of an appropriate signal. As will be appreciated, a device operating in a power save state also preferably includes a mechanism allowing it to return to active state at an appropriate time. Therefore, the device may include a receiver detection module configured to determine an operational condition of the link indicating resumption of communications may occur. By employing the techniques of this disclosure, additional power savings may be realized by selectively reducing the power consumed by the receiver detection module. In some embodiments, a signal detection module is configured to receive a signal from the transmitter of a device at the other end of the communications link to control the operation of the receiver detection module.

Figure 1:
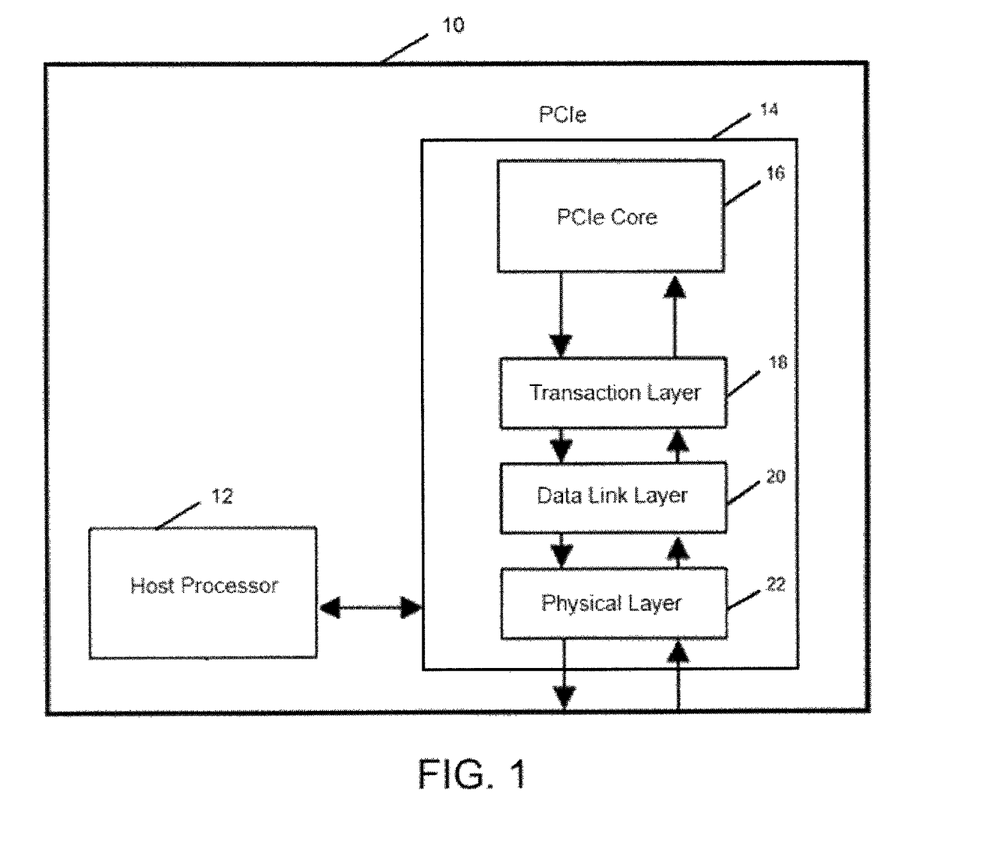
FIG. 1 is a schematic illustration of the layered configuration of the PCI Express architecture.

As an example of a suitable serial communication system, the PCI Express architecture may be represented by logical layers with regard to device 10 shown in FIG. 1. Host processor 12 may communicate over a suitable interconnect with PCIe module 14, which may include PCIe Core 16, transaction layer 18, data link layer 20 and physical layer 22. Software layers, including the PCI plug and play module and software driver module, are preferably implemented in PCIe Core 16. Compatibility with the PCI addressing module may be maintained to ensure that all existing applications and drivers operate unchanged. Similarly, the PCI Express configuration may use standard mechanisms defined in the PCI plug-and-play specification. Generally, the software layers generate read and write requests that are transported by the transaction layer 18 to the I/O devices using a packet-based, split-transaction protocol. The data link layer 20 adds sequence numbers and CRC to these packets to create a highly reliable data transfer mechanism. The basic physical layer 22 may be implemented as a dual simplex channel having a transmit pair and a receive pair. Each transmit and receive pair is termed a "lane." For example, PCI Express 3.0 is the current standard and is herein incorporated by reference, and uses a 128b/130b encoding scheme and an 8 GT/s bit rate to provide a bandwidth capacity of 1 GB/s per lane. As will be seen, device 10 may be a host device or a client device.

Figure 2:
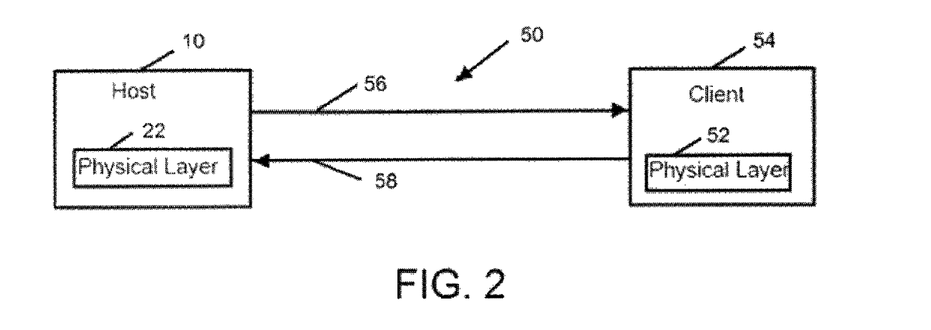
FIG. 2 is a schematic illustration of the fundamental PCI Express link between two PCIe devices.

As shown in FIG. 2, the fundamental PCI Express link 50 formed by physical layer 22 of device 10 in communication with physical layer 52 of device 54 includes at least one lane comprising two low-voltage AC-coupled differential pairs of signals, transmit pair 56 and receive pair 58. In the embodiment shown, device 10 is a host and device 54 is a client, but the opposite roles may be employed or the device may be otherwise configured as desired depending upon their roles in the PCIe communication system. A data clock may be embedded using the 128b/130b encoding scheme to achieve very high data rates. Thus, the physical layer transports packets between the link layers of two PCI Express devices.

The bandwidth of a PCI Express link may be scaled by adding signal pairs to form multiple lanes. The physical layer may provide x1, x2, x4, x8, x12, x16, and x32 lane widths, which conceptually splits the incoming data packets among these lanes. Each byte is transmitted across the lane(s). This data disassembly and reassembly may be transparent to other layers. During initialization, each PCI Express link may be set up following a negotiation of lane widths and frequency of operation by the two agents at each end of the link. In one embodiment, no firmware or OS software is involved. The PCI Express architecture may provide for future performance enhancements via speed upgrades and/or advanced encoding techniques.

Various link states are identified in the PCI Express specification for power management of devices. The link states represent a decreasing amount of power consumption that comes at the expense of an increasing latency in returning to the fully functional state. The L0 state is the fully operational power state with full power on and all clocks running. The first level of power savings is represented by the L0s state. A chief characteristics of the L0s state is a very low exit latency, allowing the use of the L0s state to reduce power consumption during short intervals of logical idle between link activities. The specified wake-up to the L0 state from the L0s state is less than 10 ns. In this logical idle state, the receiver can maintain the clock signal and symbol synchronization associated with the link because the transceiver continues to send idle symbols, which do not contain data and may be discarded by the receiver.

The next level of power reduction is represented by the L1 state, which offers greater degree of power savings at the expense of some increase in the latency required to wake up to the L0 state. In general, the L1 state may be enabled to reduce power when the link has a lack of outstanding requests or pending transactions. The specified wake-up for L1 state is less than 10 μs. In the L1 state, the device is in an electrical idle state, such that no differential voltage is applied to the link and no signaling occurs. Thus, in the L1 state, the device loses synchronization with the link clock and may employ a clock data recovery (CDR) circuit to reestablish synchronization when transitioning to an active state. Further, the device may optionally power off its internal clock circuit.

Finally, the L2/L3 states are the least power consuming state with all power and clocks shut down. As the link moves from the L0 state towards a L2/L3 state, more power saving may be achieved but the exit latency may increase from these states to transition back to the L0 state.

Conventionally, a PCIe link operating in the L1 link state involves the use of a receiver detection module in the form of electrical idle detection circuits that are operational and consume significant power. The electrical idle detection circuit is used to determine the link is in the L1 state and when a transition to the L0 state is requested. Accordingly, the majority of power consumed in the L1 link state may be attributed to the circuits used for the electrical idle detection circuits. The present application describes a device and method for significantly reducing the power consumption of a PCI Express system operating in a low-power link mode by selectively operating the receiver detection module in a power save state.

Devices utilizing a PCI Express architecture and operating in an environment where data traffic is transmitted in bursts, such as a Wireless Local Area Network (WLAN), are frequently placed into standby mode. Operating the link in an L1 state is advantageous in a WLAN environment because the burst environment allows the device to go into a power save state for short periods of time while the low exit latency from the L1 state allows the device to transition from L1 state to L0 state very quickly.

In accordance with the PCI Express specification, an electrical idle signal at the physical layer is enabled in the L1 state. As noted above, a receiver detection module conventionally remains active in the L1 state to allow a device to detect an exit from electrical idle to receive request signals, such as the TS1 (training sequence to align and synchronize the bits) ordered set, from another device requesting a connection, thereby allowing the receiving device to exit from the L1 state and to enter the L0 state.

By employing the techniques of this disclosure, significant reductions in power consumption by devices operating in reduced power mode, such as an L1 state, may be realized by powering down the receiver detection module, such as by disabling the electrical idle detection logic. As will be discussed below, systems and methods are provided for selectively operating the receiver detection module in a low power mode. Preferably, control of the receiver detection module in this manner does not significantly increase the exit latency of the device from reduced power mode.

As will be described, the selective operation of the receiver detection module may be implemented using a power module. In one aspect, the power module operates the receiver detection module in a duty cycle mode. In another aspect, the power module may be responsive to a control signal from the receiver. As discussed below, the control signal may be carried out of band or in-band depending upon the desired implementation. For in-band implementations, the power module preferably receives input from a signal detection circuit configured to sense the control signal. Examples of signal detection circuits given below include common mode detectors and differential mode detectors.

Figure 3:
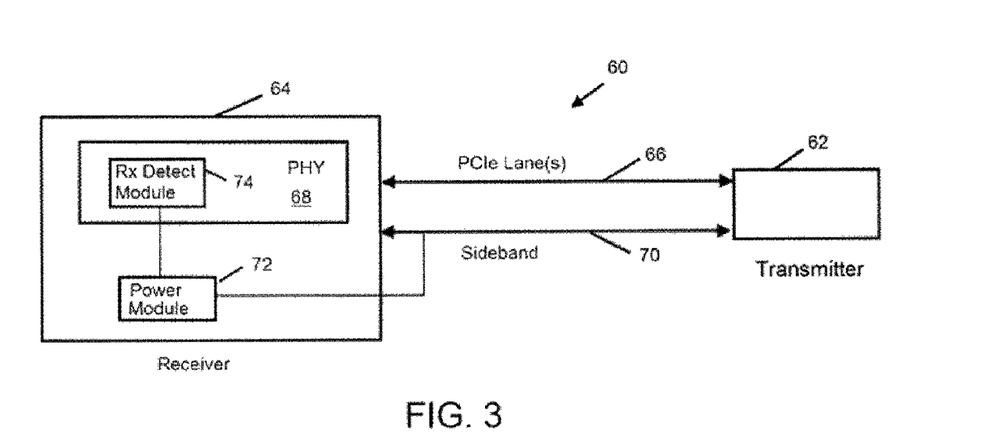
FIG. 3 is a schematic illustration of a device employing sideband signaling to control a receiver detection module, according to one embodiment of the invention.

In one embodiment, the serial link may be a PCIe link. An example of this embodiment is schematically depicted in FIG. 3 which illustrates a serial communication system 60 including transmitter device 62 and receiver device 64. As will be appreciated, devices 62 and 64 may be configured to have both reception and transmission capabilities. However, to better focus on aspects of this disclosure, only unidirectional transfer of information is shown. The PCIe interconnect includes one or more lanes 66 to provide communication between physical layer (PHY) 68 of device 64 and device 62. Additionally, sideband 70 provides one or more signals for control and management functionality that operates outside the PHY layer. Power module 72 is configured to switch the receiver detection module 74 between power save state and active state based upon a control signal. Preferably, the control signal may be a transition in the sideband 70. Since the receiver detection module 74 is included in the PHY layer of the receiver device 64 and the idle signal is delivered in-band, in some cases it may be preferable to employ an out-of-band signaling mechanism involving the sideband to facilitate a low power mode of the receiver device 64 that includes the receiver detection module 74 being in a power save state.

Figure 4:
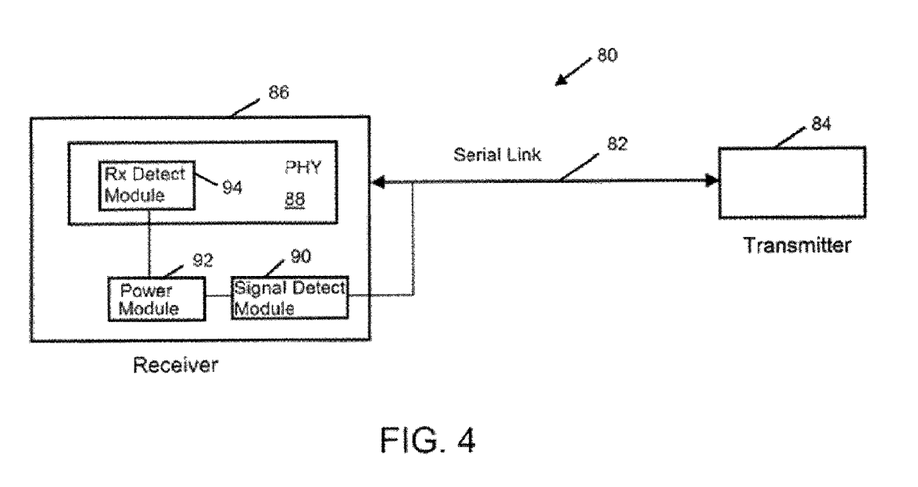
FIG. 4 is a schematic illustration of a device employing in-band signaling to control a receiver detection module, according to one embodiment of the invention.

Alternatively, an in-band signaling configuration may used to control the power module as shown in serial communication system 80 of FIG. 4. As depicted, a serial link 82 between the transmitter device 84 and the receiver device 86 provides data communication between the PHY 88 of device 86 and device 84. A signal detector module 90, in receiver device 86 is configured to determine the presence of a control signal on the serial link. Upon detection of the control signal, power module 92 operates to transition receiver detection module 94 between a low power mode and an active mode. Preferably, the control signal is sent in-band on the serial link using any suitable technique, including a differential mode signal or a common mode signal. Specific exemplary embodiments are described below.

In another aspect, the power module may be configured to operate the receiver detection module in a duty cycle mode of operation. Accordingly, the receiver detection module may be operated in active state for a given duration during repeating periods and in power save state for the amount of time remaining in each period. The receiver detection duty cycle may preferably be configured to operate at a duration and frequency that maintains a desired latency with regard to returning the receiver portion to its active state. A duty cycle mode may also be implemented in response to a control signal delivered in-band or through a sideband as discussed above.

As noted above, additional power usage reduction may be achieved by selectively operating the receiver detection module in a low power mode in response to a control signal delivered over a sideband. For example, the PCIe protocol specifies electrical idle detection logic implemented at the physical layer to reduce leakage power consumption. As such, power consumption of a device operating in an L1 state is reduced by disabling the electrical idle detection logic of the receiver detection module in the physical layer. Preferably, the exit latency of the device from L1 state is maintained while using the sideband signal to control the receiver detection module. Sideband signals are defined in the PCI Express specification to exist outside of the physical layer. Specifically, use of sideband signals for notifying power state transition is part of an Engineering Change Request (ECR) to PCI Express specification but is not yet a part of the PCI Express specification. This particular sideband (CLKREQ) is noted in Chapter 5 of PCIE spec (Power Management chapter)

Figure 5:
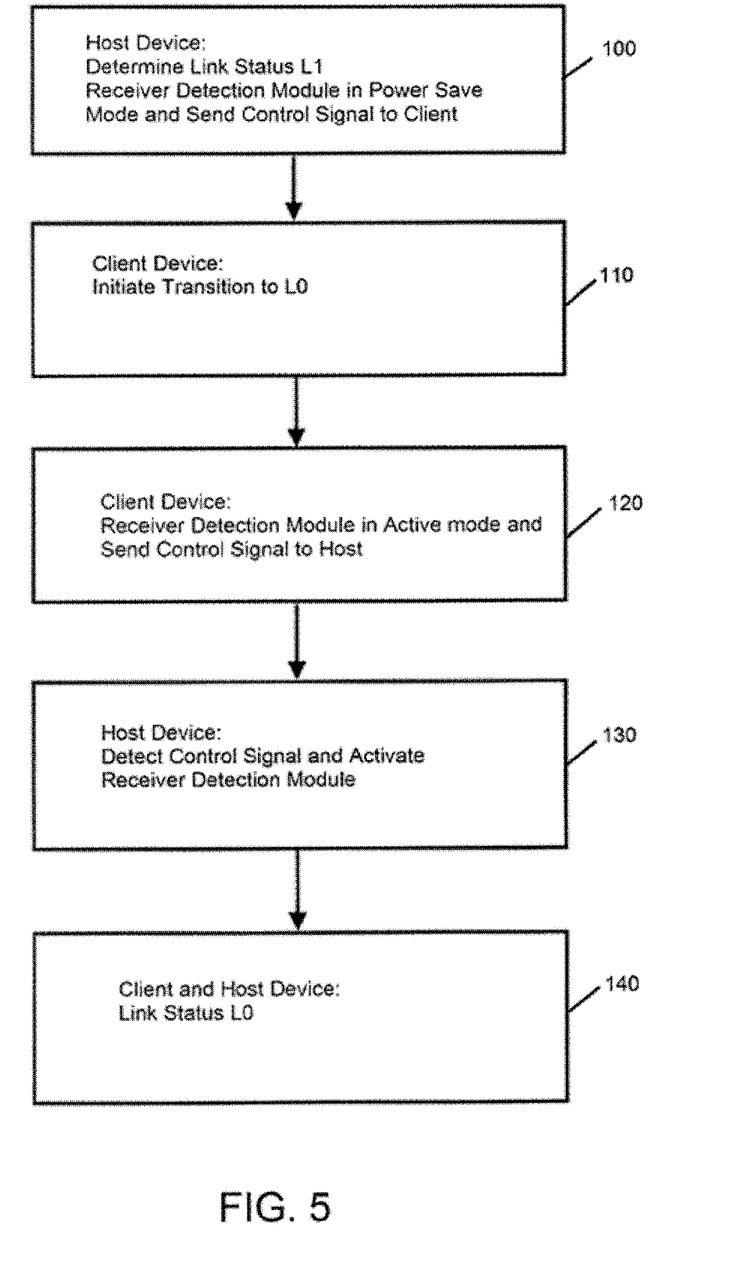
FIG. 5 is a flow diagram illustrating one method for reducing PCIe power consumption using sideband signaling to control a receiver detection module, according to one embodiment of the invention.

FIG. 5 illustrates a flow diagram for reducing the power consumption of a device operating in a PCIe power save L1 state. In this embodiment, the PCIe interconnect is assumed to be currently operating in an L1 state and as such the electrical idle on the physical layer of the PCIe is enabled. To further reduce the power consumption in the L1 state, the host device utilizes a sideband signal to disable the electrical idle detection logic in the receiver detection module of the physical layer of PCIe at 100, thereby reducing the power consumption of the system while in the L1 state. If the client device then receives a transmission request, the client device may require that the link transition from an L1 state to an L0 state in step 110. To make this transition, the client device enables the electrical idle detection logic in the receiver detection module and signals the host device to activate its receiver detection module to enable its electrical idle detection logic using a transition in a sideband signal as represented by step 120. The host device will detect the transition in the sideband signal to re-enable the electrical idle detection logic in its PCIe PHY layer in step 130. Once the receiver detection module is operating in the active state, the link can transition from the L1 state to the L0 state as required in step 140. The method as described above may additionally be employed in the reverse direction, wherein the host device initiates the link transition and the client device detects the transition in the sideband signal to transition from the L1 state to the L0 state.

In accordance with the PCIe specification the transition from the L1 state to the L0 state is required to meet the exit latency requirement. If the host device is busy performing critical operations and is unable to guarantee that the exit latency for L1 state can be maintained, additional circuitry may be required to guarantee the required exit latency for L1 state.

Figure 6:
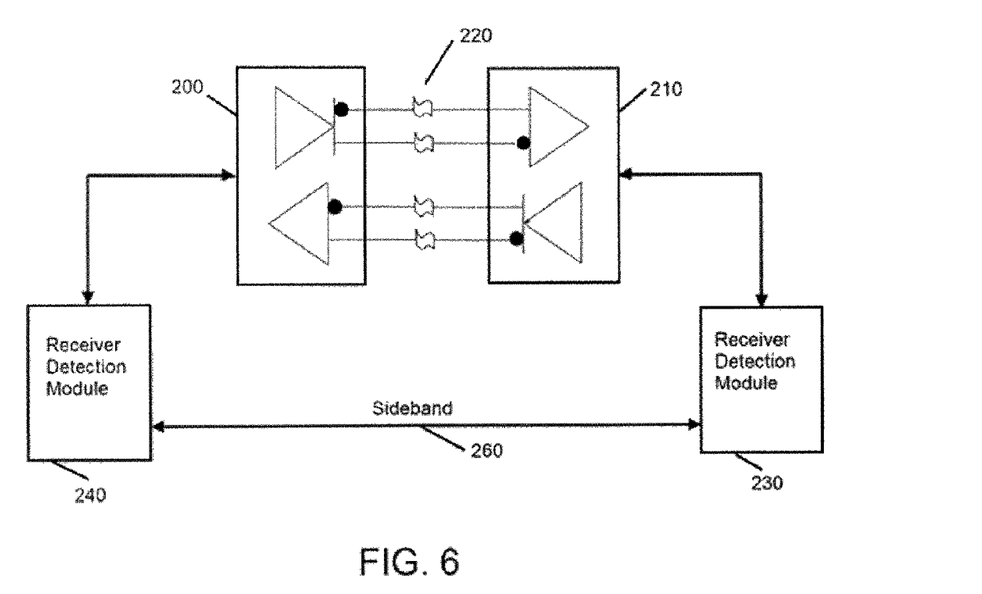
FIG. 6 is a block diagram illustrating a system for reducing PCIe power consumption using sideband signaling to control a receiver detection module, according to one embodiment of the invention.

With reference to FIG. 6, a host device 200 is connected to a client device 210 through a PCIe interconnect 220. The client device 210 may be coupled to a low-latency receiver detection module 230, which may be implemented in the physical layer and a sideband 260. The host device 200 may be coupled to a low-latency receiver detection module 240, which may be implemented in the physical layer and a sideband 260. In a specific embodiment, when the PCIe enters a power save L1 state, the electrical idle detection logic of receiver detection modules 230 and 240 of the client device 210 and the host device 200, respectively, may be disabled to further reduce the power consumption of the system by utilizing a control signal transmitted using sideband 260.

When the client device 210 receives a transmission request, such as an incoming WLAN packet, the client device 210 requests that the link exit the L1 state and enter the L0 state. To transition to the L0 state, the client device 210 enables its electrical idle detection logic by activating receiver detection module 230 and signals the host device to enable its electrical idle detection logic in receiver detection module 240 using a transition on a sideband signal in the sideband 260. After the electrical idle detection logic has been enabled, the link transitions from the L1 state to the L0 state and the client device 210 initiates a connection. By utilizing receiver detection modules 230 and 240 to disable and enable the electrical idle detection logic, the PCIe system may maintain the exit latency requirement for L1 state.

Figure 7:
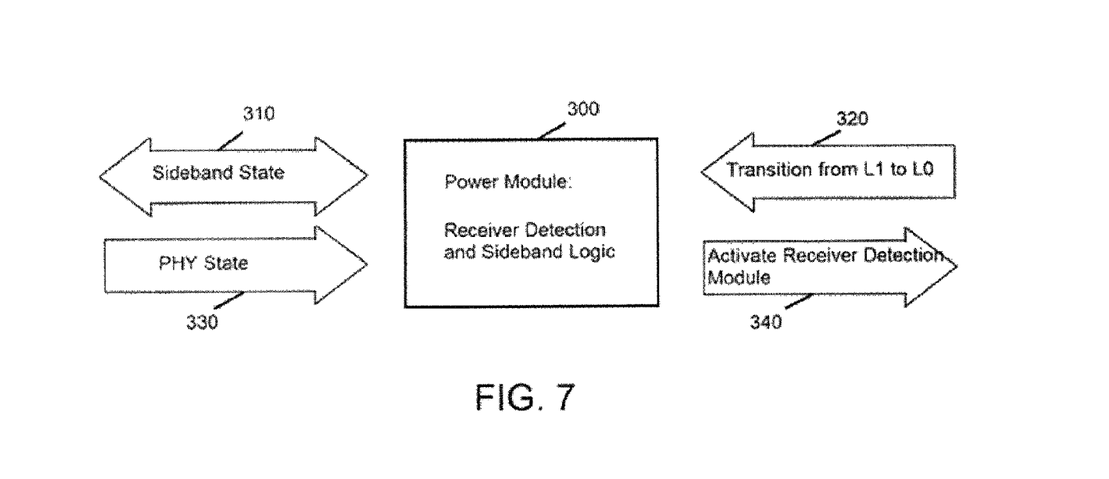
FIG. 7 is a block diagram illustrating logic operation involving sideband signaling to control a receiver detection module, according to one embodiment of the invention.

FIG. 7 is a block diagram illustrating the operation of the logic 300 of power module 72, to control the receiver detection module and the sideband signaling. As shown with reference to FIG. 3, power module logic 300 receives input signals including the sideband state 310, the PHY state 330 and a request to exit the L1 state to transition to the L0 state 320. Based on these input signals, the logic 300 may provide an output to the sideband to transition the sideband signal to a different sideband state 310 and may provide an output to the PHY to activate the receiver detection module 340.

In other embodiments of the invention, in-band techniques are used to signal changes in link states, which do not require the use of a sideband signals that would require IC package pins and additional PCB routing. In high speed serial links, it may be advantageous to use the differential data signals to also communicate changes in link state using an in-band signaling technique. This helps to minimize the number of signals that need to be routed between devices. When a serial communications link is in a power save state, such as the L1 state, it may be desirable for one device to signal the other device to "wake-up" without consuming any active power while in the idle or sleep state. Example of such in-band signaling mechanisms include the use of common mode and differential mode detectors as described below.

Figure 8:
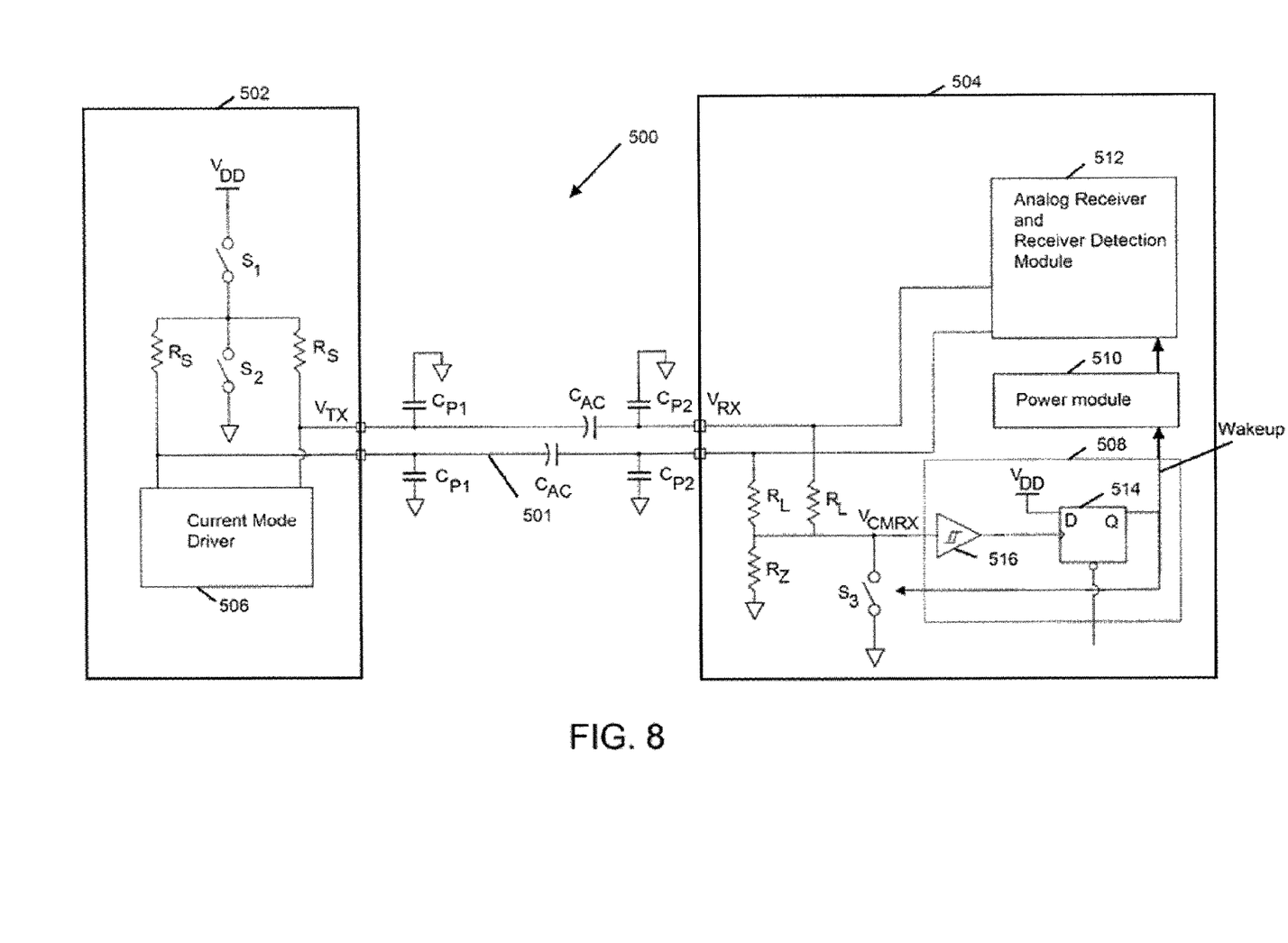
FIG. 8 is a schematic illustration of circuitry for common mode in-band signaling to control a receiver detection module, according to one embodiment of the invention.

FIG. 8 is a schematic circuit diagram of one suitable in-band, common mode state level detection system 500 that may be used to detect a control signal delivered over a serial communications link including a differential transmission pair 501 between transmitter 502 and receiver 504. As shown, AC coupling capacitors, $C_{AC}$ are provided on both sides of differential pair 501 to isolate transmitter 502 and receiver 504. Further, the parasitic capacitances intrinsic to the link are modeled as $C_{P1}$ and $C_{P2}$.

Current mode driver 506 is configured to deliver the common-mode control signal over differential pair 501 to be sensed by signal detection module 508. In turn, power module 510, in response to signal detection module 508, may be used to selectively operate receiver detection module 512 in low power mode. Preferably, the detection circuit is configured so that it does not require any static or dynamic power dissipation in either the transmitter 502 or receiver 504. As such, the current-mode driver 506 in the transmitter 502 and the analog receiver and receiver detection modules 508 in the receiver 504 are completely powered off in the low power mode.

While in low power mode, the output common-mode voltage of the transmitter 502 is connected to ground by opening switch S2 and closing switch S1. Also, switch S3 in receiver 504 is open to reset signal detection module 508. In this configuration, receiver 504 presents a large input common-mode resistance. Thus, in the power save state, the transmitter 502 voltage $V_{TX}$ and the receiver 504 voltage $V_{RX}$ will settle to ground, e.g., 0 volts. A wake-up control signal may be initiated by opening switch S1 and closing switch S2 at transmitter 502. As a result, $V_{TX}$ rises rapidly. To minimize delays in the voltage rise, it is preferable to minimize the parasitic capacitances $C_{P1}$ and $C_{P2}$. By setting the resistor values such that $R_Z \gg R_L$ and $R_S$, $V_{RX}$ and $V_{CMRX}$ may be configured to closely follow the rise of $V_{TX}$. In one embodiment, $R_L$ and $R_S$ may be set to 50 ohms. Accordingly, signal detection module 508 may be configured to sense the rise of $V_{CMRX}$ as shown. In this embodiment, signal detection module 508 includes a rising edge detector circuit composed of a Schmitt trigger 516 coupled to a D Flip-flop 514, is used to detect the change in $V_{CMRX}$. When $V_{CMRX}$ exceeds the threshold of Schmitt trigger 516, a wake-up signal may be sent from the output of D Flip-flop 514 to power module 510 and to close switch S3, so that the receiver presents the impedance of the $R_L$ resistors, such as 50 ohms.

Figure 9:
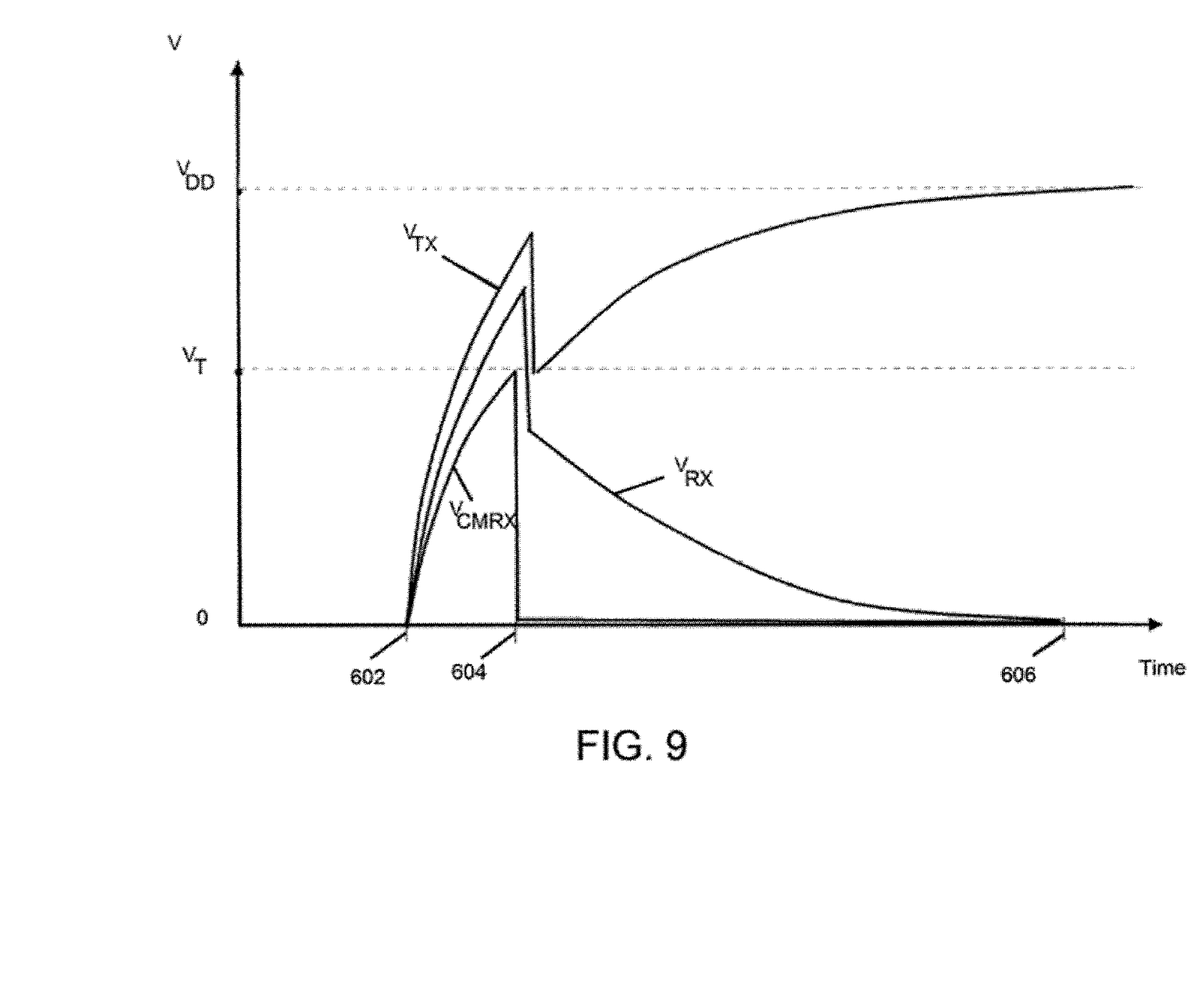
FIG. 9 is a graph of voltage levels during operation of the circuit shown in FIG. 8, according to one embodiment of the invention.

Operation of the common mode detection system 500 is depicted in FIG. 9, which shows changes in common-mode signal levels $V_{TX}$ and $Vg_X$ in the transmitter 502 and receiver 504 during a wake-up sequence graphed as a function of time. As described, transmitter 502 sends a wake-up signal to receiver 504 by opening switch S1 and closing switch S2. This is illustrated in FIG. 9 at point 602 along the time axis. This causes $V_{TX}$ to rise rapidly as shown in FIG. 9. $V_{RX}$ and $V_{CMRX}$ follow $V_{TX}$ until $V_{CMRX}$ exceeds the threshold of the Schmitt trigger 516, depicted as $V_T$ in FIG. 9. This causes signal detection module 508 to output the wake-up signal to the power module 510 and closes switch S3 at time 604. Preferably, sufficient time may be allowed for charging of the AC coupling capacitors, $C_{AC}$, before start of normal operation, thereby allowing the transmission of valid data as shown at point 606 in FIG. 9 after sufficient common-mode settling. Rising edge detector 508 preferably is a CMOS circuit that does not consume any power during the sleep state except for leakage current. The $V_T$ threshold for the Schmitt trigger 516 is set appropriately to reliably detect common-mode change without significant false detections.

Figure 10:
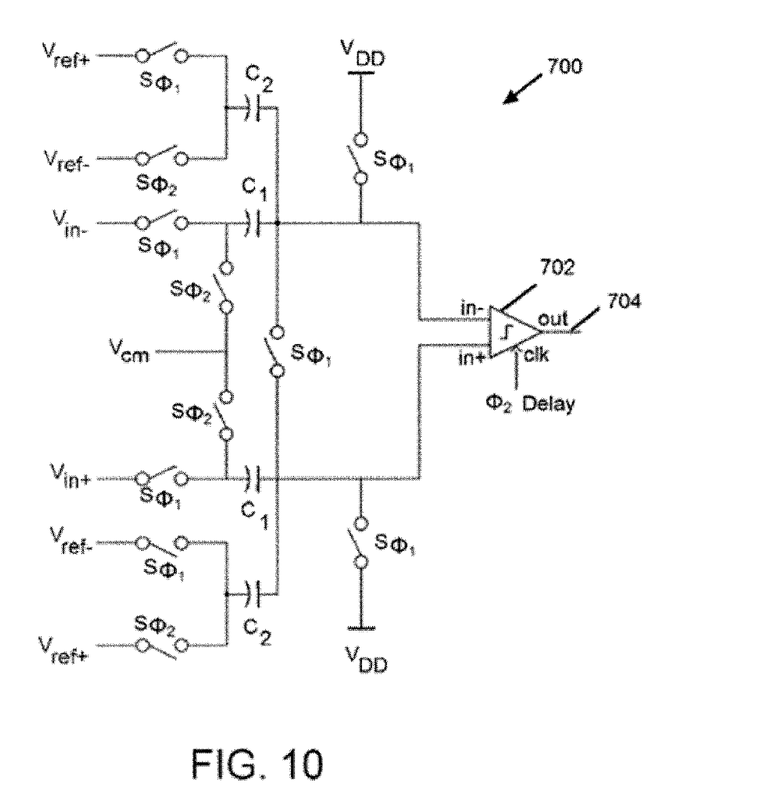
FIG. 10 is a schematic illustration of circuitry for differential mode in-band signaling to control a receiver detection module, according to one embodiment of the invention.
Figure 11:
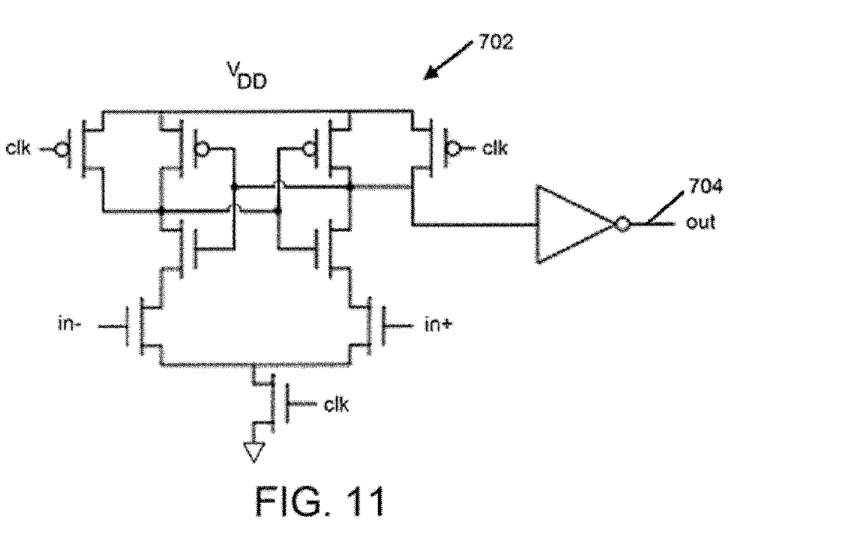
FIG. 11 is a schematic illustration of the regenerative latch used in the circuit shown in FIG. 10, according to one embodiment of the invention.
Figure 12:
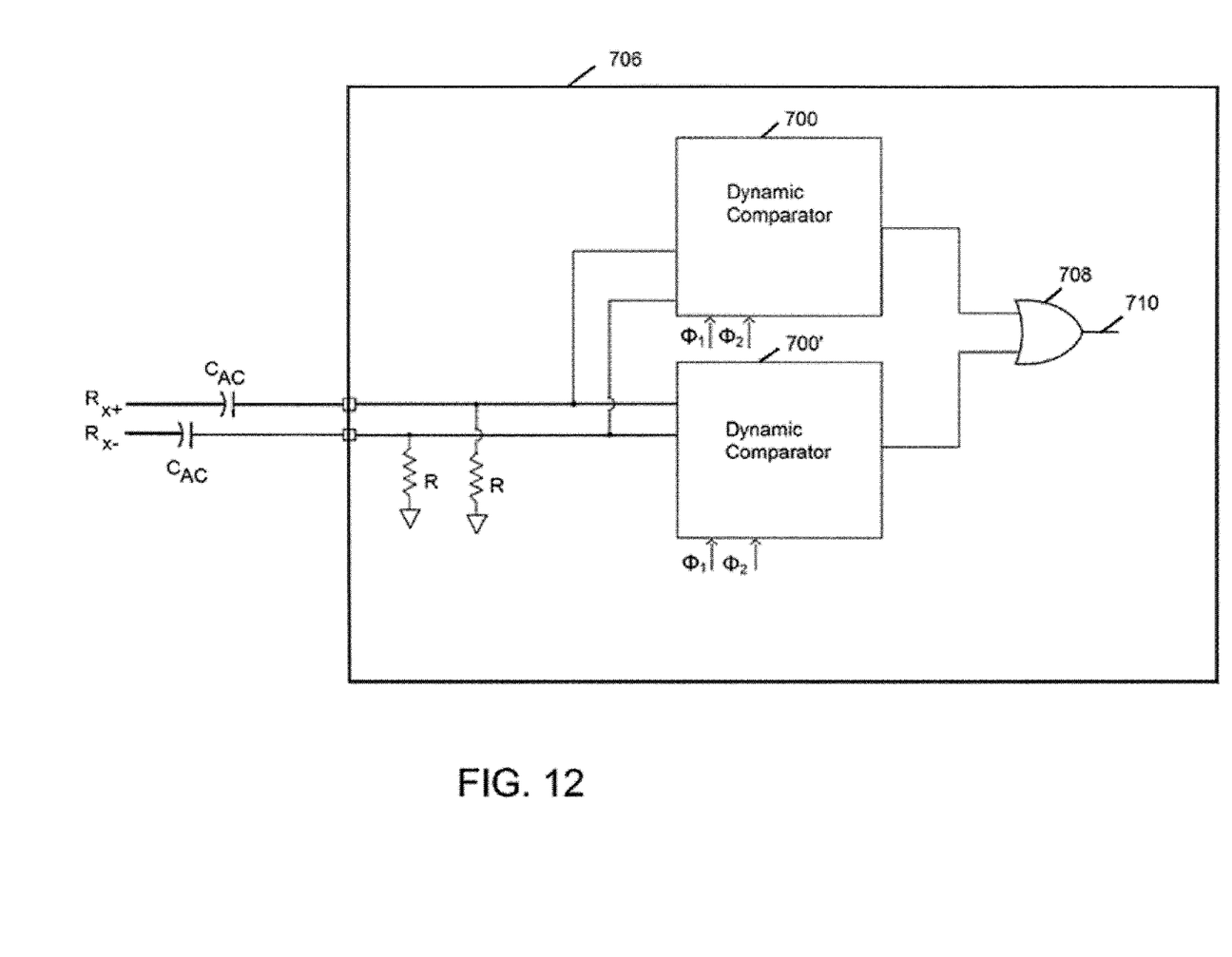
FIG. 12 is a schematic illustration showing the use of the differential mode circuits shown in FIG. 10 for in-band signaling to control a receiver detection module, according to one embodiment of the invention.

Another embodiment of the present invention, an alternate in-band signal detection module employing a differential mode detector is illustrated in FIGS. 10-12. As will be discussed below, a differential mode detector may be configured to detect the presence of a differential Rx input as a control signal for use by the power module to selectively operated the receiver detection module in low power mode. For example, in a PCIe implementation, the receiver may detect the presence of a differential Rx input that signals the transmitter's exit from an electrical idle state, such as the L1 state. In a PCIe embodiment, the detector may have a differential input threshold between 32.5 mV and 87.5 mV. Accordingly, the differential mode detector may preferably provide a method and circuitry to detect small Rx input levels with a low-power dynamic circuit that may consume negligible static DC power.

FIG. 10 illustrates dynamic comparator circuit 700 that may be used to form differential mode detector 706, shown in FIG. 12, for example. The comparator 700 employs two non-overlapping clock signals, $\Phi_1$ and $\Phi_2$, used to drive a series of switches as shown. During the sampling phase, $\Phi_1$ switches are closed and the $\Phi_2$ switches are open. In this state, the input voltage $V_{in}$ is sampled by the C1 capacitors and one polarity of the reference voltage is sampled by the C2 capacitors. Since the clock signals are non-overlapping, the $\Phi_1$ switches are then opened and the $\Phi_2$ switches closed, connecting the C2 capacitors to the opposite polarity reference voltage. The resulting voltage is received at the input of the regenerative latch 702 and has a value of $[C1*(V_{in+}-V_{in-})-C2*(V_{ref+}-V_{ref-})]/(C1+C2)$. Preferably, regenerative latch 702 is configured to be triggered a short delay after $\Phi_2$ switch closes, $\Phi_2$ delay, and provides an output 704 indicating if the sampled input is larger than a threshold. Preferably, the delay is configured to allow the switch-capacitor network to settle before triggering the comparator 700. In one embodiment, regenerative latch 702 may be implemented using the CMOS circuit shown in FIG. 11. The threshold voltage of comparator 700 may be determined as: $V_{th}=(C2/C1)*(V_{ref+}-V_{ref-})$. $V_{ref+}$ and $V_{ref-}$ may be $V_{DD}$ and GND respectively and $V_{cm}$ may be GND.

FIG. 12 illustrates the combination of two dynamic comparators 700 and 700'. In the embodiment shown, comparator 700 is coupled to the $R_{x+}$ signal, so may be configured to trigger an output when $V_{in+}-V_{in-}>V_{th}$. Similarly, comparator 700' is coupled to the $R_{x-}$ signal and produces an output when $V_{in+}-V_{in-}<-V_{th}$. The outputs of comparator 700 and 700' are fed to OR gate 708 to provide a control signal at output 710 whenever the absolute value of the input voltage exceeds Vth. Output 710 may then be fed to a power module as described above to selectively operate the receiver detection module in low power mode. As will be appreciated, suitable configuration of a differential low-power control signal detector described in FIGS. 10-12 involves a number of aspects. First, the input switch-capacitor network preferably has sufficiently high bandwidth to sample the Rx signals generated by the serial communication link. Second, the detector operates asynchronously to the Rx input signal and may sometimes sample the Rx signal transitions instead of the signal peaks, thus failing to detect a valid signal. However, the detector may detect the presence of an Rx input after multiple clock cycles. Third, since this type of detector may inject noise onto the Rx input due to the switching capacitors, it may be desirable to engage the detector only during the idle mode. Fourth, while the detector uses two non-overlapping clock signals, the clock frequency may not need to be very accurate and may be generated using a low-power R-C oscillator, or other suitable means.

The foregoing descriptions of specific embodiments of have been presented for purposes of illustration and description. They are not intended to be exhaustive or to limit the invention to the precise forms disclosed, and obviously many modifications and variations are possible in light of the above teaching. The embodiments were chosen and described in order to best explain the principles and practical applications, to thereby enable others skilled in the art to best utilize the various embodiments with various modifications as are suited to the particular use contemplated. It is intended that the scope be defined by the claims appended hereto and their equivalents.

What is claimed is:

1. A communication system comprising:
 a transmitter;
 a receiver including a receiver detection module and a power module; and
 a serial link between the transmitter and the receiver, wherein the receiver detection module to be operable during a power save state of the serial link to determine an operational condition of the serial link and wherein the power module to selectively operate the receiver detection module in a low power mode during the power save state of the serial link by transitioning the receiver detection module from the low power mode to an active mode in response to a control signal sent by the transmitter during the power save state of the serial link,
 a sideband link between the transmitter and the receiver, wherein the power module to selectively operate the receiver detection module in the low power mode on the basis of the control signal carried by the sideband link.

2. The communications system of claim 1, wherein the low power mode of the receiver detection module is a duty cycle mode.

3. The communication system of claim 1, wherein the serial link comprises a PCIe link.

4. The communication system of claim 1, wherein the receiver detection module comprises electric idle detection logic.

5. The communication system of claim 4, wherein the power module to disable the electric idle detection logic to selectively operate the receiver detection module in the low power mode.

6. A serial communication system comprising a host having a transmitter and a client having a receiver, wherein the transmitter and the receiver to communicate through transfer of differential data signals over a link using a protocol that specifies at least one active state and at least one power save state, a receiver detection module in the client to be operable during the power save state to determine an operational state of the link, and a power module in the client to selectively operate the receiver detection module in a low power mode on the basis of a control signal from the host by transitioning the receiver detection module from the low power mode to an active mode in response to the control signal sent during the power save state of the serial link,
 wherein the serial communication system is a PCIe system and wherein the active state of the serial communication system is a L0 link state and the power save state of the serial communication system is a L 1 link state;
 a sideband and wherein the power module receives the control signal on the sideband.

7. The serial communication system of claim 6, wherein the receiver detection module comprises electric idle detection logic and wherein the low power mode of the receiver detection module disables the electric idle detection logic.

8. The serial communication system of claim 6, wherein the power module to selectively operate the receiver detection module in low power mode by operating the receiver detection module in a duty cycle mode.

9. A method for standby power reduction in a serial communication system having a transmitter and receiver, communicating over a serial data link, comprising:
 operating the serial data link in a power save state; and
 selectively operating a receiver detection module of the receiver to determine an operational condition of the serial data link in a low power mode while the serial data link is in the power save state, wherein selective operation of the receiver detection module includes transitioning the receiver detection module from the low power mode to an active mode in response to a control signal sent by the transmitter during the power save state of the serial link,
 wherein determining the operational condition of the serial data link comprises determining an operational condition of a PCIe link, wherein the power save state of the serial data link is an L1 state, and wherein operating in the low power mode comprises disabling electrical idle detection logic in the receiver detection module, coupling the transmitter and receiver with a sideband link and sending the control signal on the sideband link, wherein the control signal comprises a transition in a sideband signal.

* * * * *